US007619762B2

(12) United States Patent
Chavers et al.

(10) Patent No.: US 7,619,762 B2
(45) Date of Patent: *Nov. 17, 2009

(54) CUSTOMIZABLE MULTI-FUNCTION PRINTING DEVICE

(75) Inventors: A. Greg Chavers, N. Richland Hills, TX (US); Christopher S. Faro, Lexington, KY (US); Kevin P. Goffinet, Lexington, KY (US); Timothy S. Seevers, Lexington, KY (US); Randy S. Sparks, Lexington, KY (US); John S. Steele, Lexington, KY (US); James F. Webb, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1207 days.

This patent is subject to a terminal disclaimer.

(21) Appl. No.: 10/424,590

(22) Filed: Apr. 28, 2003

(65) Prior Publication Data

US 2004/0212823 A1 Oct. 28, 2004

(51) Int. Cl.
*G06F 15/00* (2006.01)
*H04N 1/00* (2006.01)
*G06F 3/00* (2006.01)

(52) U.S. Cl. .................... 358/1.15; 715/774; 715/745; 715/835; 399/81

(58) Field of Classification Search ............... 345/348, 345/765, 841, 854, 353; 395/610, 326; 358/1.13, 358/1.15, 1.14, 1.18; 710/16; 399/81; 715/835, 715/744, 745, 840
See application file for complete search history.

(56) References Cited

U.S. PATENT DOCUMENTS

| 5,025,396 | A |   | 6/1991  | Parks et al.              |
|-----------|---|---|---------|---------------------------|
| 5,159,324 | A |   | 10/1992 | Ohtani et al.             |
| 5,260,744 | A |   | 11/1993 | Nishimori                 |
| 5,428,730 | A |   | 6/1995  | Baker et al.              |
| 5,515,176 | A |   | 5/1996  | Galen et al.              |
| 5,530,907 | A |   | 6/1996  | Pavey et al.              |
| 5,604,860 | A | * | 2/1997  | McLaughlin et al. ...... 715/866 |
| 5,625,465 | A |   | 4/1997  | Lech et al.               |
| 5,689,286 | A | * | 11/1997 | Wugofski ................ 715/835 |

(Continued)

*Primary Examiner*—David K Moore
*Assistant Examiner*—Ashish K Thomas
(74) *Attorney, Agent, or Firm*—Taft, Stettinus & Hollister

(57) ABSTRACT

A multi-function network printing device includes customizable functions and user interfaces for one of several identified vertical industry spaces. The method includes the steps of: (a) providing a multi-function network printing device; (b) identifying a business purpose having specialized needs; and (c) customizing the built-in functions and the associated GUI icons based upon the specialized needs of the identified business purpose. In a more specific embodiment, the customizing step includes the step of adding additional functions to the multi-function device and associated icons displayed on the graphical-user-interface. In yet a further detailed embodiment, the customizing step includes the steps of: (i) providing a plurality of customization programs, each of which are associated with a particular business purpose; (ii) selecting one of the plurality of customization programs depending upon the business purpose identified in the identifying steps; and (iii) running the selected customization program on the multi-function device.

12 Claims, 6 Drawing Sheets

U.S. PATENT DOCUMENTS

| | | | |
|---|---|---|---|
| 5,717,439 A * | 2/1998 | Levine et al. | 715/835 |
| 5,726,883 A | 3/1998 | Levine et al. | |
| 5,832,339 A | 11/1998 | Inui et al. | |
| 5,877,746 A | 3/1999 | Parks et al. | |
| 6,026,258 A | 2/2000 | Fresk et al. | |
| 6,288,719 B1 | 9/2001 | Squilla et al. | |
| 6,470,155 B1 | 10/2002 | Martin et al. | |
| 6,501,485 B1 | 12/2002 | Dash et al. | |
| 7,263,661 B2 * | 8/2007 | Chavers et al. | 715/744 |
| 2002/0122204 A1 * | 9/2002 | Van Der Meijs | 358/1.15 |
| 2003/0011644 A1 | 1/2003 | Bilsing et al. | |
| 2003/0030664 A1 * | 2/2003 | Parry | 345/744 |
| 2003/0052926 A1 * | 3/2003 | Dunlap et al. | 345/841 |
| 2003/0067488 A1 * | 4/2003 | Rudd et al. | 345/765 |
| 2003/1006748 * | 4/2003 | Rudd et al. | 345/765 |
| 2003/0184789 A1 * | 10/2003 | Komaki | 358/1.13 |

* cited by examiner

US 7,619,762 B2

CUSTOMIZABLE MULTI-FUNCTION PRINTING DEVICE

BACKGROUND

Embodiments of the present invention relates to a multi-function network printing device; and more particularly, to a multi-function network printing device that includes customizable functions and user interfaces for one of several identified vertical industry spaces.

Conventional multi-function printers and network copiers (MFPs) are products that are designed to provide a small set of functions to a wide variety of business situations. These machines typically offer functions for copying, faxing, scanning, network printing, and emailing a scanned document. The functions offered on these MFP devices are somewhat limited due to an attempt to provide one device that meets the needs of many diverse buyers and environments. Because the functions, configurations and settings of these MFPs do not typically take into account the specific needs of any one group or vertical industry space, a "one size fits all" approach has evolved.

SUMMARY

Rather than taking an approach that provides a set of features that represent the least common denominator, the multi-function network printing device of one embodiment of the present invention is specifically designed to meet the document solution needs of specifically identified business sectors. By choosing a number of key business sectors (i.e., industry verticals), it is possible to redefine the functions, configurations and settings of the MFP to include features and functionality that may specifically be of interest to that particular business sector. With this approach, it is possible to redefine the way in which the base functions of the MFP operate, and extend the functionality of the MFP to offer additional solutions beyond that of what a conventional MFP offers. In an exemplary embodiment, the present invention combines the flexibility of a document workflow server/software with the ability to redefine the appearance and behavior of an MFP.

One embodiment of the invention, as discussed above, is directed to a multi-function network printing device (MFP) that is customized to meet unique needs of a particular industry space (such as a legal office, a healthcare facility, an engineering office, etc.). Such tangible MFP products are provided via a method of providing a standard hardware configuration along with specialized software programs (downloadable, or stored on disks or CDs, for example) that enable easy adaptation of the standard hardware to the user's particular needs based upon the user's vertical industry space. This customization is carried out, in part, by providing a procedure of extending/supplementing the base functions of the MFP along with providing a procedure for customizing the display and/or the graphical-user-interface (GUI) of the MFP.

Therefore, it is a first aspect of the present invention to provide a method for customizing the operation of a multi-function device. The multi-function device has two or more built-in functions such as copying, printing, faxing, scanning and emailing. The multi-function device also has a graphical-user-interface displaying icons representing the built-in functions of the multi-function device, where the user may activate the icons to command the multi-function device to perform the associated built-in function. The method includes the steps of: (a) providing such a multi-function device; (b) identifying a business purpose having specialized needs; and (c) customizing the built-in functions and the associated GUI icons based upon the specialized needs of the identified business purpose. In a more specific embodiment, the customizing step includes the step of adding additional functions to the multi-function device and associated icons displayed on the graphical-user-interface. In yet a further detailed embodiment, the customizing step includes the steps of: (i) providing a plurality of customization programs, each of which are associated with a particular business purpose; (ii) selecting one of the plurality of customization programs depending upon the business purpose identified in the identifying steps; and (iii) running the selected customization program on the multi-function device. In yet a further detailed embodiment, the business purpose is a legal office, a healthcare facility, a public sector facility, a home office, a retail facility, a manufacturing facility, a finance office, a telephone (call center) facility, or a public utility facility.

In an alternate detailed embodiment of the first aspect of the present invention, the business purpose is a legal office and the customizing step customizes the built-in functions and associated GUI icons of the multi-function device to include at least some of the following built-in functions and associated icons: (i) a function providing the ability to annotate an electronic document handled by the multi-function device by adding a unique identifier to each page of the electronic document (i.e., a Bates Stamp function); (ii) a function providing the ability to scan a tangible document to an electronic document and to submit the electronic document to an electronic archive system (such as World Docs) accessible by the multi-function device; (iii) a function providing the ability to track activities of the multi-function device and to associate the tracked activities to one or more clients so that the clients can be charged the cost of such activities; (iv) a function providing the ability to electronically mail an electronic document handled by the multi-function device as an electronic equivalent to registered postal mail; and (v) a function providing the ability to scan a tangible document into an electronic document and to convert the text images in the electronic document into a word processing format, capable of being edited by a word processor.

In an alternate detailed embodiment of the first aspect of the present invention, the business purpose identified as a healthcare facility, and the customizing step customizes the built-in functions and associated icons of the multi-function device to include some of the following built-in functions and associated icons: (i) a function providing the ability to route an electronic document handled by the multi-function device to any network location accessible by the multi-function device (such as to a pharmacy, to admitting, to radiology, etc.); (ii) a function providing the ability to access and print commonly-used forms; (iii) a function providing the ability to scan a tangible document into an electronic document and to submit the electronic document to an electronic archival system accessible by the multi-function device; and (iv) a function providing the ability to track the activities of the multi-function device and to associate the tracked activities to respective patients so that the respective patients' records can be monitored and/or audited.

In yet another alternate detailed embodiment of the first aspect of the present invention, the customizing step includes the steps of providing a plurality of customizations programs, each of which are associated with a respective business purpose; selecting one of the plurality of customization programs depending upon the business purpose identified in the identifying step; and running the selected customization program on the multi-function device. In a further detailed embodiment, the business purpose may be a legal office, a healthcare facility, a public-sector facility, a home office, a retail facility, a manufacturing facility, a finance office, a call-center facility, or a public utility facility.

It is a second aspect of the present invention to provide a method for customizing the operation of such a multi-function device that includes the steps of: (a) providing a multi-function device; (b) identifying the business purpose having specialized needs; and (c) customizing the icons displayed on the graphical-user-interface based upon the specialized needs of the identified business purpose.

It is a third aspect of the present invention to provide a multi-function network printer that includes: (a) a network interface; (b) a printer module; (c) a scanner module; (d) a fax module; (e) a graphical-user-interface; and (f) a controller operatively coupled to the network interface, the printer module, the scanner module, the fax module, and the graphical-user-interface; where the controller runs a program that is configured to display icons on the graphical-user-interface representing available functions of the multi-function device and to operate the network interface, printer module, scanner module and/or fax module upon activation of one of more of the displayed icons; and where the available functions and displayed icons are customizable upon identifying a business purpose for the multi-function network printer, where the business purpose has specialized needs beyond basic copying, faxing, network printing and emailing a scanned document functions of the multi-function network printer. In a further detailed embodiment, the multi-function printer further includes a plurality of external customization programs, each of which are adapted to configure the available functions and displayed icons for a respective business purpose.

DETAILED DESCRIPTION

In an exemplary embodiment, the present invention relates to a multi-function network printing device; and more particularly, to a multi-function network printing device that includes customizable functions and user interfaces for one of several identified vertical industry spaces (such as a legal office, a healthcare facility, an engineering office, etc.). In one embodiment, the present invention combines the flexibility of a document workflow server/software with the ability to redefine the appearance and behavior of an MFP. Such tangible MFP products are provided via a method of providing a standard hardware configuration along with specialized software programs (downloadable, or stored on disks or CDs, for example) that enable easy adaptation of the standard hardware to the user's particular needs based upon the user's vertical industry space. This customization can be carried out, in part, by providing a procedure of extending/supplementing the base functions of the MFP along with providing a procedure for customizing the display and/or the graphical-user-interface (GUI) of the MFP.

Figure 1:
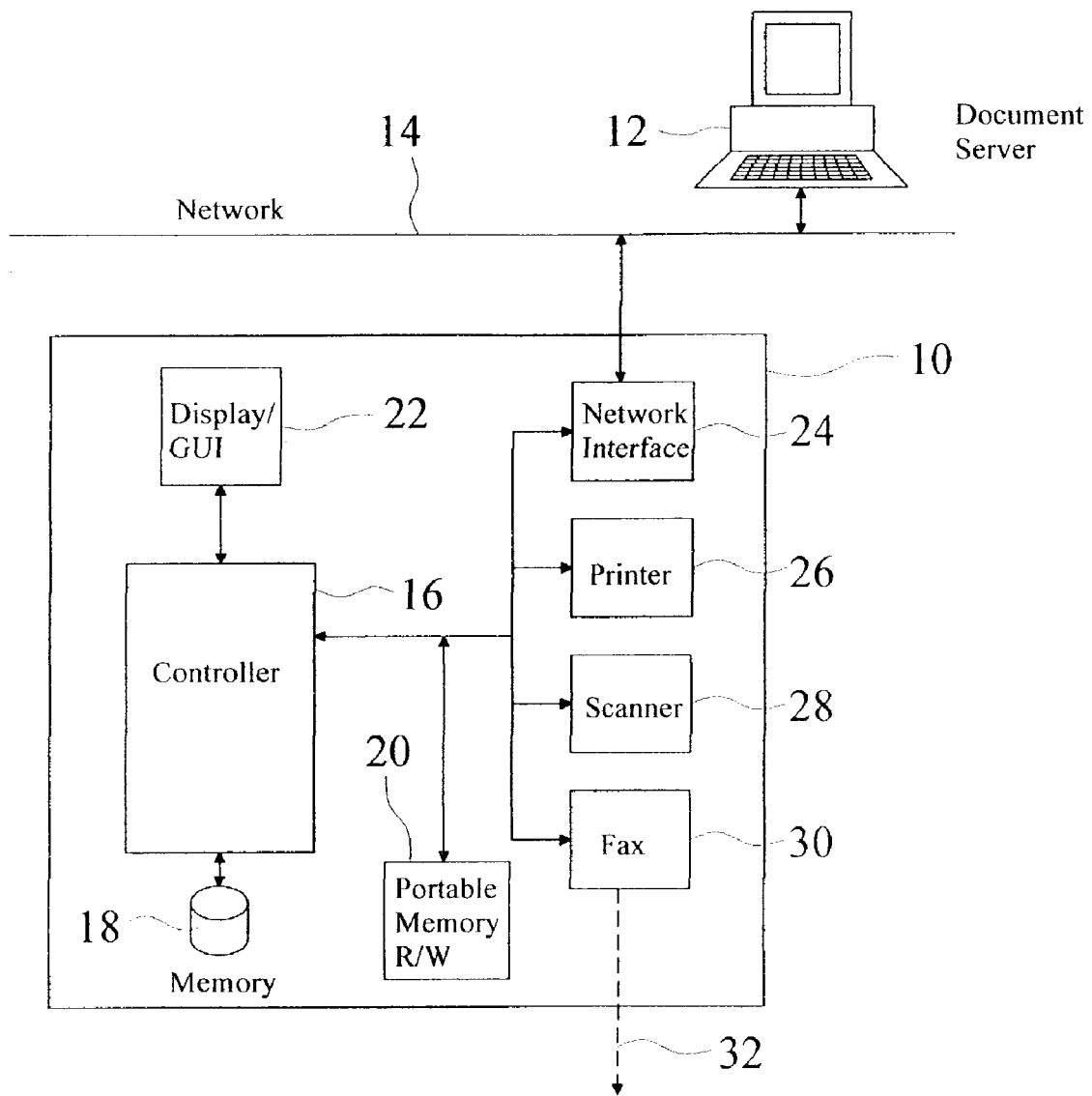
FIG. 1 is a schematic block-diagram presentation of a multi-function network printer device that includes an external document server.

As shown in FIG. 1, a multi-function network printer ("MFP") device includes a primary multi-function unit 10 and a document server 12 both of which are operatively coupled to (i.e., either a direct or wireless coupling), and communicate over a computer network 14. Of course, other computers, servers, printers, archives, and related devices may also be operatively coupled to the network as well, and may communicate with the multi-function unit and/or the document server over such network connection.

The multi-function unit 10 includes a controller 16 having access to an internal memory 18, which includes internal RAM and may also include an internal hard drive or a similar device. The controller may also be operatively coupled to a portable memory read/write device 20, such as a disk drive, R/W CD drive, and the like. This portable memory read/write device 20 may also be a read-only device, such as read-only CD drive. Also operatively coupled to the controller is a graphical-user-interface 22. The graphical-user-interface in the exemplary embodiment preferably utilizes an icon-based touch-screen (or similar) interface. Of course, it is within the scope of the invention to use any type of moveable-cursor-based interface, which would typically necessitate the use of a cursor-control device such as a mouse, a roller ball, or any similar cursor-control devices known by those of ordinary skill.

The multi-function unit 10 also includes a network interface 24 operative coupled between the network 14 and the controller 16 for allowing the multi-function printer unit 10 to communicate over the computer network. The multi-function unit 10 also includes a printer module 26, operatively coupled to controller 16. The printer module 26 includes, for example, the necessary hardware in code that allows the multi-function printer unit 10 to print documents submitted over the network 14 or held in either of the memory devices 18, 20. The multi-function unit 10 may also include a scanner module 28, operatively coupled to the controller 16, which includes, for example, the necessary code and hardware for scanning tangible documents on the multi-function unit and storing the scanned electronic documents on an internal memory device 18, 20. Finally, the multi-function unit 10 may also include a fax module 30, which includes, for example, the necessary hardware and code for faxing electronic documents over a telephone line 32 or the like. The fax module may also have an internal scanning device for scanning tangible documents or may work with the scanning module 28 for scanning tangible documents and faxing documents over the telephone line 32.

The document server 12 works in concert with the multi-function unit 10 for performing special functions on electronic documents that may be handled by the multi-function unit 10. For example, the multi-function unit 10 can work in concert with the document server 12 for emailing electronic documents scanned by the multi-function unit 10 to a desired electronic address accessible over the network 14. The document server 12 may also include specialized functions for setting up and controlling the operations of the multi-function unit. It should also be apparent to those of ordinary skill that it is within the scope of the invention to combine the document server 12 and multi-function unit 10 into a single unit operatively coupled to the network 14.

Figure 2:
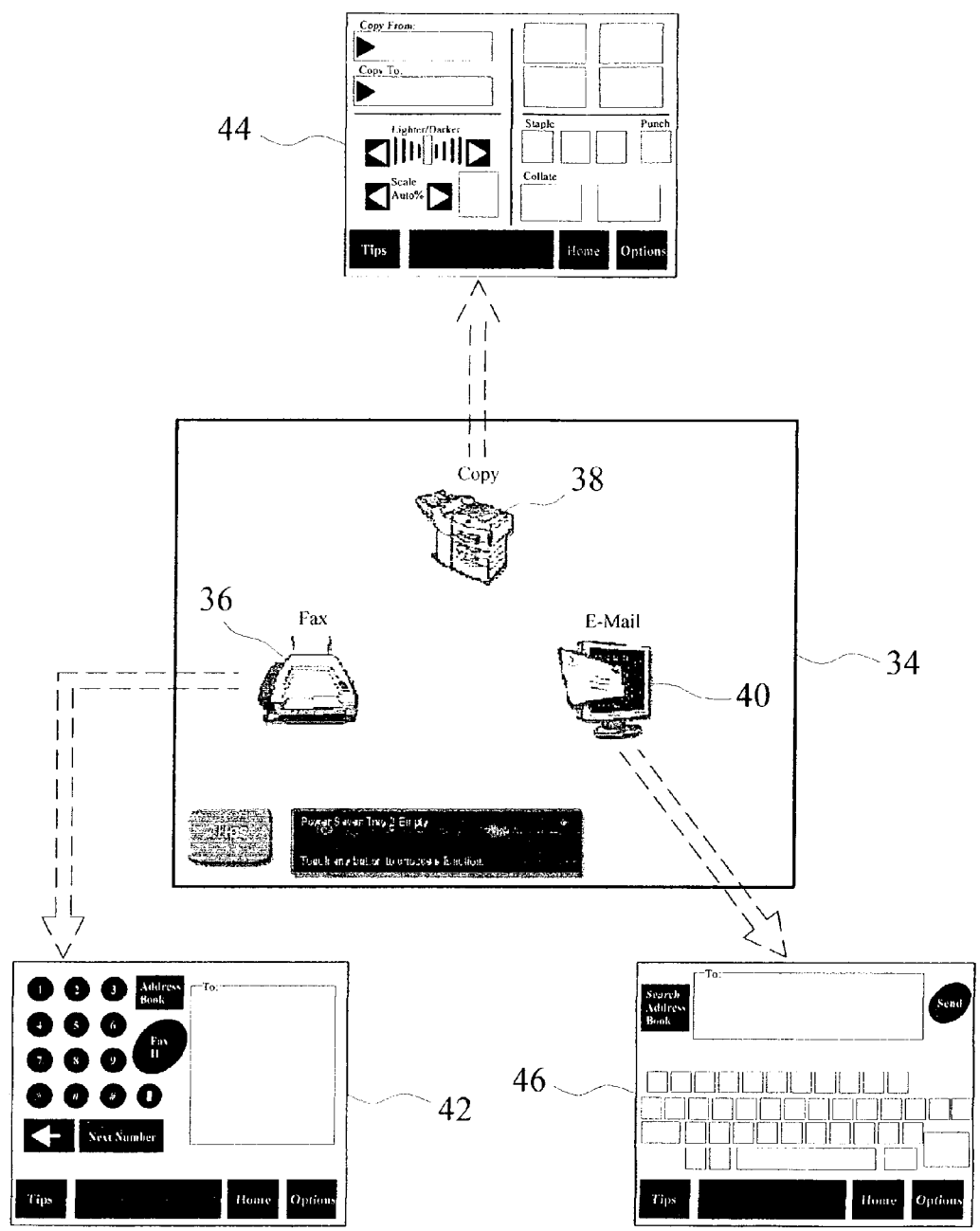
FIG. 2 is a diagram representing the "Welcome" screen shot for a conventional multi-function printer, along with screen shots of interfaces provided upon activation of respective icons in the Welcome screen.

As shown in FIG. 2, the MFP will have standard factory settings, prior to customization, to reflect basic functions of conventional multi-function network printer devices. As shown in FIG. 2, the initial welcome screen 34 on the graphical-user-interface 22 may include icons allowing the user to activate several basic functions of the MFP. As shown in FIG. 2, these pre-installed basic functions may include, for example, a faxing function represented by a fax icon 36, a copying function represented by a copying icon 38 and a scan-to-email function represented by the email icon 40. As also shown in FIG. 2, upon activating the fax icon 36, the graphical-user-interface will then provide a graphical interface 42 that includes icons and associated fields for allowing the user to fax an electronic document stored by or scanned into the multi-function unit 10 or over the network 14. Upon activating the copy icon 38, the graphical-user-interface will advance to a graphical interface 44 providing icons and fields for controlling the copying functions of the multi-function unit 10. Finally, upon activating the email icon 40, the graphical-user-interface will provide an interface 46 for allowing the user to type in an email message and attach electronic documents (either stored by the multi-function unit 10, scanned by the multi-function unit 10, stored on the server 12, or available over the network 14) to the email message, and send that email over to an electronic address over the network 14.

As discussed above, one embodiment of the present invention is specifically designed to allow the MFP to be customized to meet the document solution needs of one of a plurality of identified vertical business spaces. Customization software is provided for each of the plurality of identified vertical business spaces so that, upon installation of the MFP within one of the vertical business spaces, the person installing the system will have the opportunity to run one of these installation programs specific to the vertical business space into which the MFP is being installed, to automatically (or semi-automatically) customize the functionality of the MFP as well as the graphical-user-interface 22 of the multi-function printer unit 10. The specific customization program will also provide the installer with the ability to add additional functions, modify existing functions and/or customize the look of any or all of the icons displayed on the graphical-user-interface 22.

Examples of vertical business spaces in which such customization programs might be created include: a legal sector, a healthcare sector, public sector (such as for a police office, fire station, motor vehicle bureau, school, etc.), an insurance sector, a home office sector, a retail sector, a manufacturing sector, a financial sector (such as for a bank), a telephonic sector (such for a as a call-center), and a public utility facility.

Figure 3:
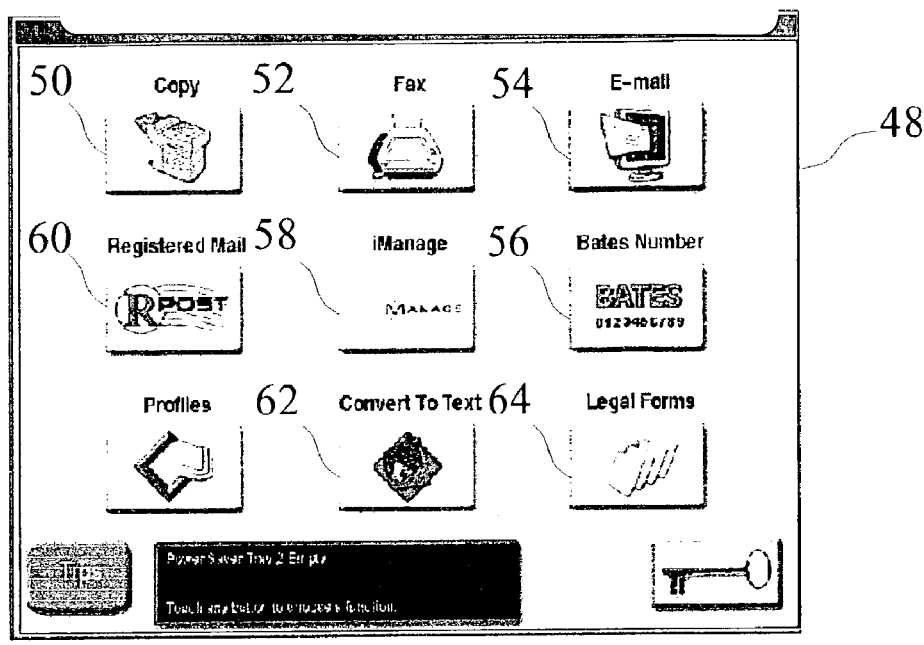
FIG. 3 is an example graphical-user-interface "Welcome" screen for the multi-function printer device according to an embodiment of the present invention, customized for use in a legal office.

Referring to FIG. 3, as a specific example, customization of the MFP for a legal industry vertical business space will typically involve keeping the standard base functions (such as copy, fax and scan-to-email), but the behavior of these functions may be modified/customized to provide a cost recovery solution so that these functions can be billed to a particular client. Accordingly, upon activating the copy icon 50, the fax icon 52, or the scan-to-email icon 54, an intermediary screen will be presented requiring the user to identify a client and/or a matter for the particular activity so that the costs attributed to such activities can be billed to that particular client or otherwise tracked. Once that intermediary screen has been completed, the particular function-specific screens will be provided similar to those shown in FIG. 2.

The customized graphical-user-interface 48 may also include additional functions, such as: a function providing the ability to annotate an electronic document handled by the multi-function device by adding a unique identifier to each page of the electronic document (e.g., Bates Number stamping) as shown by icon 56; a function providing the ability to scan a tangible document to an electronic document and to submit the electronic document to an electronic archive system accessible by the multi-function device (such as scanning and archiving to an iManage® archive) as shown by icon 58; a function providing the ability to electronically mail an electronic document handled by the multi-function device as an electronic equivalent to a registered postal mail (e.g., RPost® as shown by icon 60; a function providing the ability to scan a tangible document into an electronic document and to convert the text images of the electronic document into a word-processing format capable of being editing by a word-processor (e.g., WordPerfect® or Microsoft Word®) as shown by icon 62; and a function providing the ability for the user to access legal forms stored within the multi-function network printer device or accessible over the network 14, enter information into the forms (where certain information can be pre-entered in the forms based upon the user's profile or the client/matter numbers entered previously) and printing, faxing and/or emailing the filled-in form using the MFP as shown by icon 64.

Figure 4:
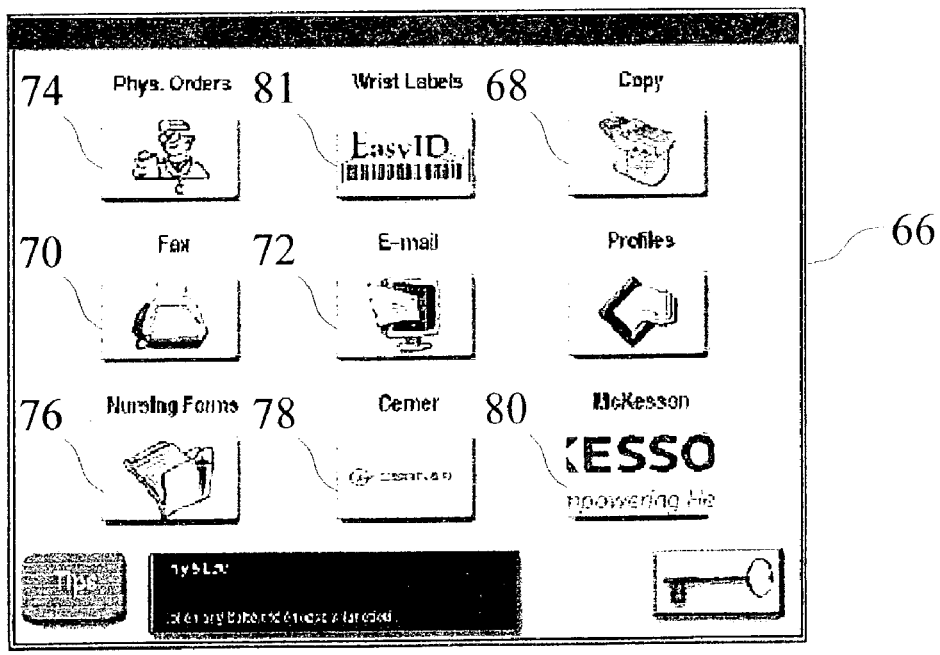
FIG. 4 is an example graphical-user-interface "Welcome" screen for the multi-function printer device according to an embodiment of the present invention, customized for use in a healthcare facility.

FIG. 4 provides an example of customized graphical-user-interface screen 66 customized for use in a health-facility vertical sector. As with the legal field vertical space as described in FIG. 3, the health-facility vertical space also allows for the basic MFP capabilities activateable by a copy icon 68, a fax icon 70 and a scan-to-email icon 72. Customization of the functions and icons with respect to the health-facility vertical space may also customize or add to the built-in functions and associated icons, such as: a function providing the ability to route an electronic document handled by the MFP to any network location accessible by the MFP (such as physicians' orders as shown by icon 74); a function providing the ability to access and print commonly-used forms (where certain information can be pre-entered in the forms based upon the user's profile or the patient's information entered previously), such as nursing forms as shown by icon 76; a function providing the ability to scan the tangible document into an electronic document and to submit the electronic document to an electronic archive system accessible by the multi-function device, such as Cerner® archive system as shown by icon 78; a function providing the ability to track activities of the MFP and to associate the tracked activities to one or more patients so that the respective patients' records can be monitored or audited, which may be activated upon activation of any of the icons on the interface 66; and a function providing the ability to create wrist labels for patients based upon entered or accessed patient information as shown by icon 81.

Figure 5:
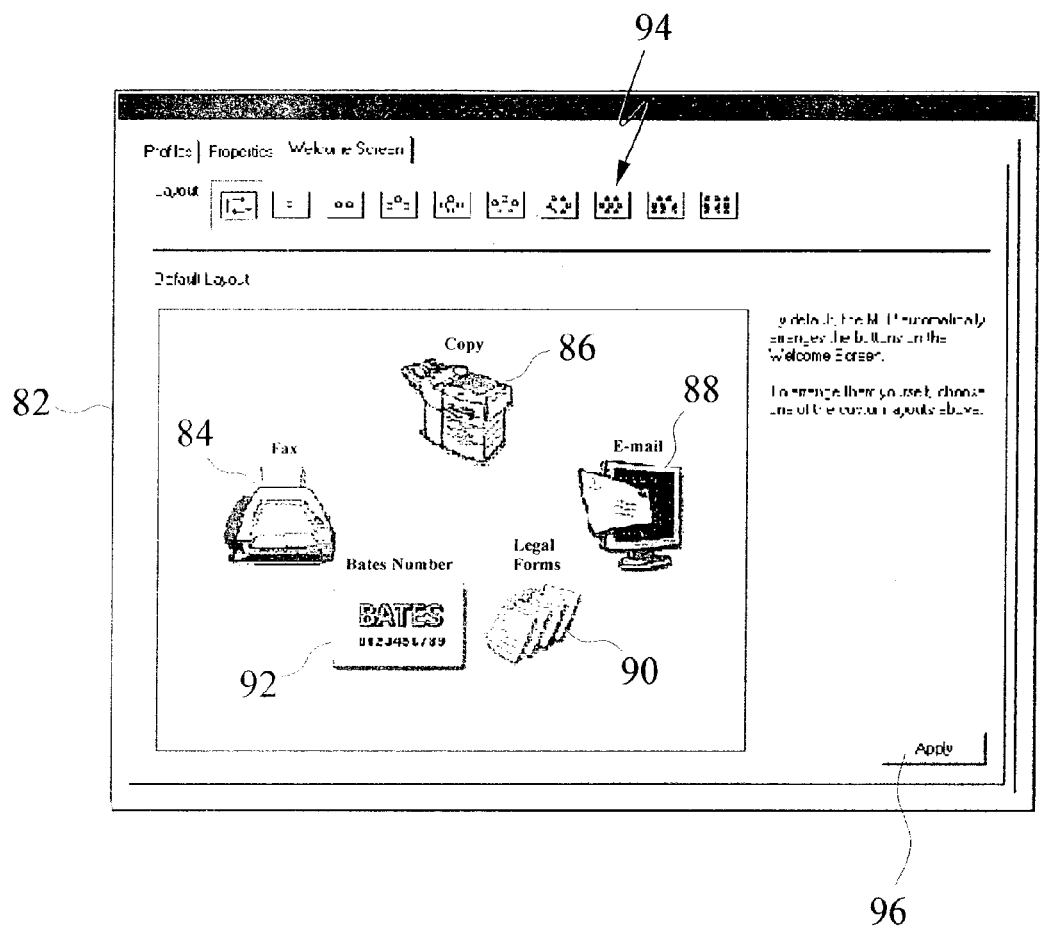
FIG. 5 is an example graphical-user-interface screen for a customization program for configuring the multi-function printer device according to an embodiment of the present invention, representing an initial step of the customization process for customizing the MFP for use in a legal office.

FIG. 5 provides an initial screen of a customization "wizard" software tool operating on the document server 12 for customizing the functionality/operations and graphical-user-interface 22 of the MFP. This set-up "wizard" software tool is, in an exemplary embodiment, provided on a CD-ROM memory device and is specific to setting-up the MFP in a legal office vertical space. As shown in FIG. 5, the set-up software tool for the legal office vertical space will automatically select the three standard functions of the multi-function network printer device illustrated in an initial interface 82 as a fax icon 84, a copy icon 86 and a scan-to-email icon 88. The set up wizard will also automatically include a legal-forms function represented by icon 90 and a Bates Numbering function represented by icon 92 into the functionality of the MFP, since legal forms and Bates numbering are two standard functions that the legal-office vertical space may typically utilize. The interface 82 shown in FIG. 5 allows the administrator/user to select the format or layout of the function icons on the graphical-user-interface 22. Once one of the layouts is selected from the layout menu 94, the administrator/user may hit the "apply" icon 96 and the set-up tool will advance to the next screen 98 as shown in FIG. 6.

Figure 6:
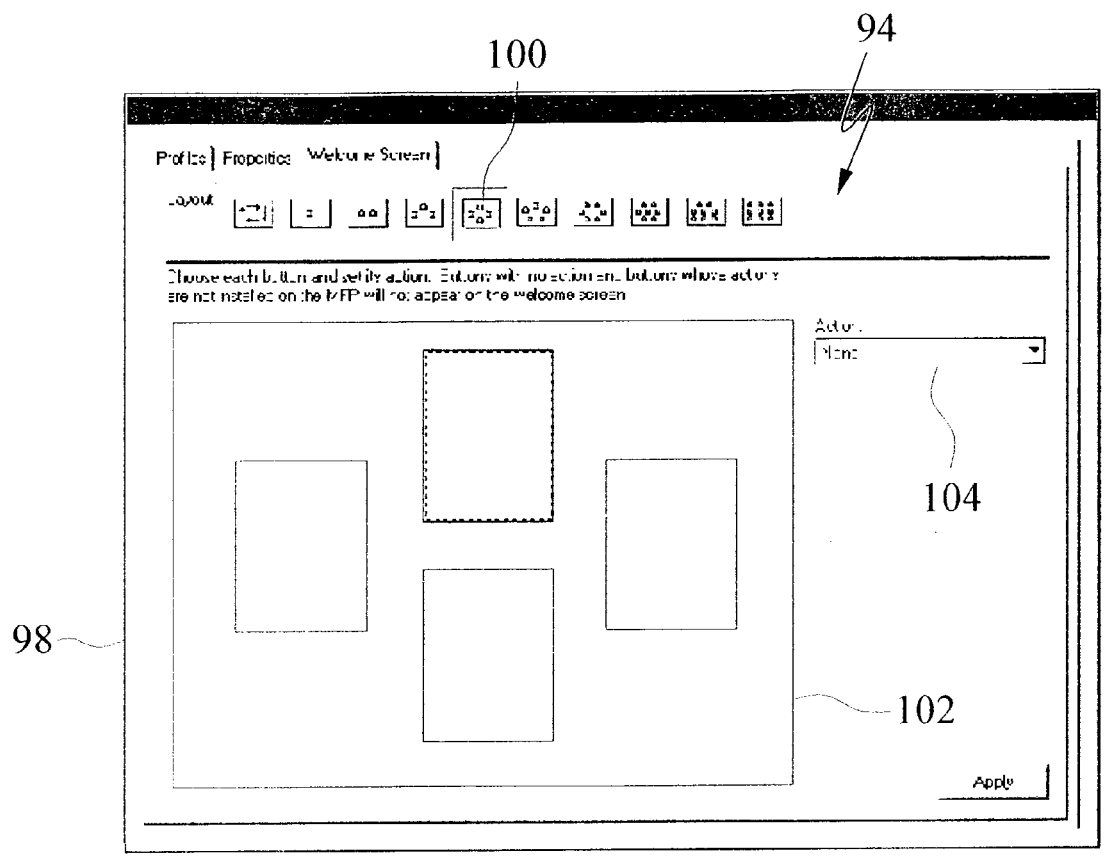
FIG. 6 is an example graphical-user-interface screen for a customization program for configuring the multi-function printer device according to an embodiment of the present invention, representing a next step of the customization process for customizing the MFP for use in a legal office.
Figure 7:
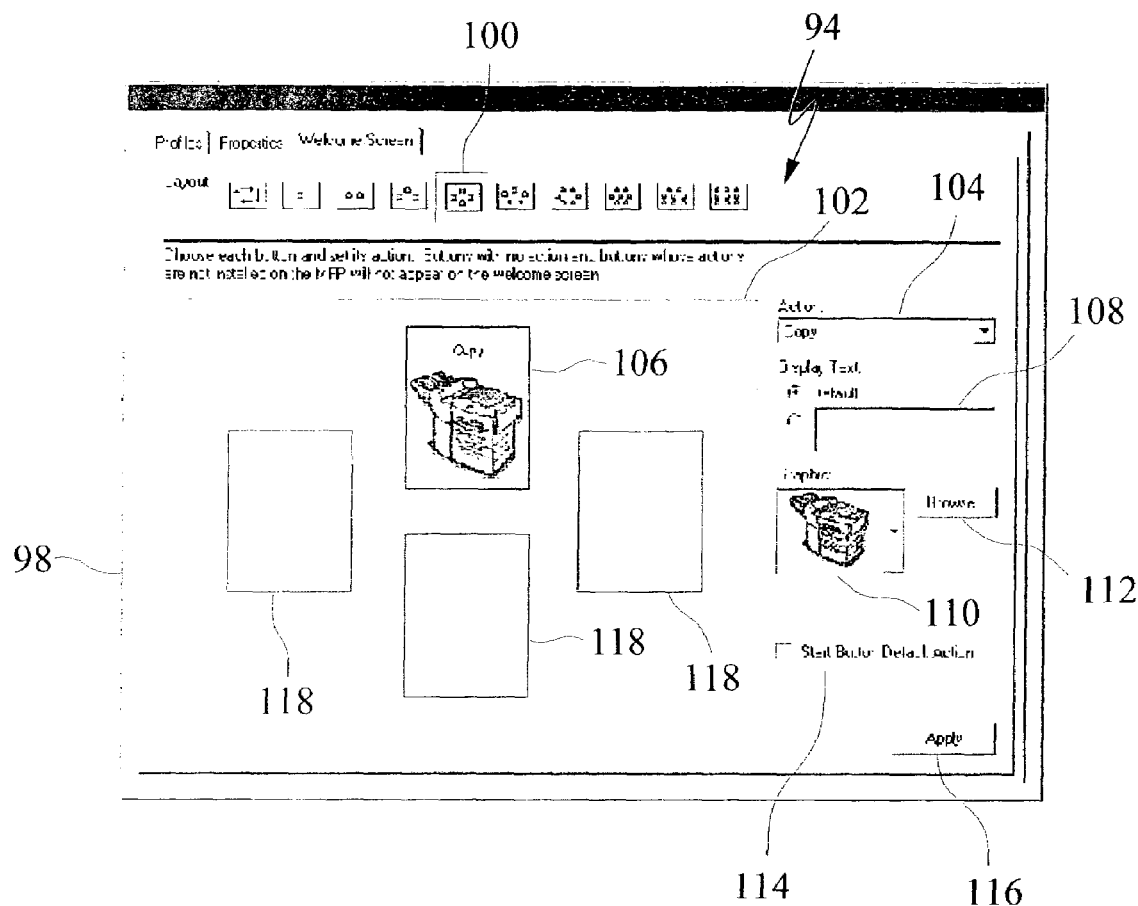
FIG. 7 is an example graphical-user-interface screen for a customization program for configuring the multi-function printer device according to an embodiment of the present invention, representing a progression from the step displayed in FIG. 6.

As shown in FIG. 6, upon selection of a particular one of the layouts 100 in the layout menu 94, "blank" icons are provided in interface 98 in which the administrator/user can select the icon in a layout window 102 and apply a particular function to that selected icon by selecting a function from the "action" pull-down menu 104. As shown in FIG. 7, assuming that the "copy" function is selected in the pull-down menu 104 for the activated icon space 106, the set-up tool will then allow the user to utilize the default text for the "copy" icon or enter customized text or title for the icon in the title customization field 108. The set-up tool may also provide a menu 110 that allows the user to select stored graphical images for the selected function. These images may be stored in the internal memory 18/20 of the multi-function printing unit 10 or may be accessible over the network 14 by the administrator/user upon the administrator selecting the "browse" icon 112. This interface 98 also includes a field 114 that the user can activate/select; which, upon selection, will cause the "start button" (a manually actuated button or switch) on the front panel of the multi-function printer unit 10 to perform the function selected in the pull-down menu 104. When the administrator/user is satisfied that this particular icon has been properly set up, the administrator/user will activate the "apply" icon 116, which will cause the set up wizard to allow the administrator/user to set up the remaining icons 118 in the icon field 102 in a similar manner.

Following from the above description and invention summaries, it should be apparent to those of ordinary skill in the art that, while the apparatuses and processes herein described constitute exemplary embodiments of the present invention, it is to be understood that the invention is not limited to these precise apparatuses and processes and that changes may be made therein without departing from the scope of the invention as defined by the claims. Additionally, it is to be understood that the invention is defined by the claims and it is not intended that any limitations or elements describing the exemplary embodiments set forth herein are to be incorporated into the meaning of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method for customizing the operation of a multi-function device, comprising the steps of:
providing a multi-function device and a document server, the multi-function device having two or more built-in functions taken from a group consisting of: copying, printing, faxing, scanning, and e-mailing, and the multi-function device having a graphical user interface displaying icons representing the built-in functions, wherein the user may activate the icons to command the multi-function device to perform the associated built-in function;
identifying a business purpose having specialized needs; and
customizing at least one of the built-in functions and the associated icons displayed on the graphical user interface based upon the specialized needs of the identified business purpose, wherein the customizing step includes the following steps:
accessing an additional function beyond the built-in functions stored on the document server in the form of a sequence operations to be performed by at least one of the multi-function unit and the document server;
associating a graphical image with the additional function;
transmitting from the document server to the multi-function unit at least a portion of the sequence of operations and the graphical image associated with the additional function;
storing the portion of the sequence of operations and the graphical image by the multi-function unit in memory; and
adding an additional icon to the graphical user interface of the multi-function unit, the additional icon including at least a portion of the graphical image transmitted to the multi-function unit from the document server, and linking the additional icon to the portion of the sequence of operations stored in memory such that activation of the additional icon initiates execution of the portion of the sequence of operations.

2. The method of claim 1, wherein the customizing step includes the steps of:
providing a plurality of customization programs, each of which are associated with a business purpose;
selecting one of the plurality of customization programs depending upon the business purpose identified in the identifying step; and
running the selected customization program on the multi-function device.

3. The method of claim 2, wherein the business purpose is taken from a group consisting of:
a legal office;
a health-care facility;
a public-sector facility;
a home office;
a retail facility;
a manufacturing facility;
a financial office;
an insurance office;
a telephonic facility; and
a public utility facility.

4. The method of claim 3, wherein the business purpose is a legal office, and the customizing step customizes the built-in functions and associated icons of the multi-function device to include two or more of the following built-in functions and associated icons:

a function providing the ability to annotate an electronic document handled by the multi-function device by adding a unique identifier to each page of the electronic document;

a function providing the ability to scan a tangible document to an electronic document and to submit electronic document to an electronic archive system accessible by the multi-function device;

a function providing the ability to track activities of the multi-function device and to associate the tracked activities to one or more clients so that the clients can be charged the cost of such activities;

a function providing the ability to electronically mail an electronic document handled by the multi-function device as an electronic equivalent to registered postal mail; and a function providing the ability to scan a tangible document into an electronic document and to convert the text images in the electronic document into a word-processing format, capable of being edited by a word processor.

5. The method of claim 3, wherein the business purpose is a health-care facility, and the customizing step customizes the built-in functions and associated icons of the multi-function device to include two or more of the following built-in functions and associated icons:

a function providing the ability to route an electronic document handled by the multi-function device to any network location accessible by the multi-function device;

a function providing the ability to access and print commonly-used forms;

a function providing the ability to scan a tangible document into an electronic document and to submit the electronic document to an electronic archive system accessible by the multi-function device;

a function providing the ability to track activities of the multi-function device and to associate the tracked activities to one or more patients so that the respective patients' records can be monitored and/or audited.

6. The method of claim 2, wherein the plurality of customization programs include customization programs for a legal office and a health-care facility.

7. The method of claim 6, wherein the customization program for the legal office customizes the built-in functions and associated icons of the multi-function device to include two or more of the following built-in functions and associated icons:

a function providing the ability to annotate an electronic document handled by the multi-function device by adding a unique identifier to each page of the electronic document;

a function providing the ability to scan a tangible document to an electronic document and to submit electronic document to an electronic archive system accessible by the multi-function device;

a function providing the ability to track activities of the multi-function device and to associate the tracked activities to one or more clients so that the clients can be charged the cost of such activities;

a function providing the ability to electronically mail an electronic document handled by the multi-function device as an electronic equivalent to registered postal mail; and a function providing the ability to scan a tangible document into an electronic document and to convert the text images in the electronic document into a word-processing format, capable of being edited by a word processor.

8. The method of claim 6, wherein the customization program for the health-care facility customizes the built-in functions and associated icons of the multi-function device to include two or more of the following built-in functions and associated icons:

a function providing the ability to route an electronic document handled by the multi-function device to any network location accessible by the multi-function device;

a function providing the ability to access and print commonly-used forms;

a function providing the ability to scan a tangible document into an electronic document and to submit the electronic document to an electronic archive system accessible by the multi-function device;

a function providing the ability to track activities of the multi-function device and to associate the tracked activities to one or more patients so that the respective patients records can be monitored and/or audited.

9. The method of claim 1, wherein the step of providing a multi-function device includes the steps of providing a computer network, providing a multi-function unit, providing a document server and operatively coupling the multi-function unit to the document server over the computer network.

10. A method for customizing the operation of a multi-function device, comprising the steps of:

providing a multi-function device and a document server, the multi-function device having two or more built-in functions taken from a group consisting of: copying, printing, faxing, scanning and e-mailing, and the multi-function device having a graphical user interface for allowing the user to activate one or more of the built-in functions;

identifying a business purpose having specialized needs; and customizing the graphical user interface based upon the specialized needs of the identified business purpose, wherein the customizing step includes the following steps:

accessing an additional function beyond the built-in functions stored on the document server in the form of a sequence of operations to be performed by at least one of the multi-function unit and the document server;

associating a graphical image with the additional function;

transmitting from the document server to the multi-function unit at least a portion of the sequence of operations and the graphical image associated with the additional function;

storing the portion of the sequence of operations and the graphical image by the multi-function unit in memory; and adding an additional icon to the graphical user interface of the multi-function unit, the additional icon including at least a portion of the graphical image transmitted to the multi-function unit from the document server, and linking the additional icon to the portion of the sequence of operations stored in memory such that activation of the additional icon initiates execution of the portion of the sequence of operations.

11. The method of claim 10, wherein the customizing step includes the steps of:

providing a plurality of customization programs, each of which are associated with a business purpose;

selecting one of the plurality of customization programs depending upon the business purpose identified in the identifying step; and running the selected customization program on the multi-function device.

12. The method of claim 11, wherein the business purpose is taken from a group consisting of:

a legal office;
a health-care facility;
a public-sector facility;
a home office;
a retail facility;
a manufacturing facility;
a financial office;
an insurance office;
a telephonic facility; and
a public utility facility.

* * * * *